UNITED STATES PATENT OFFICE.

SIEGFRIED HAMMACHER, OF BERLIN, GERMANY

ACTIVE MASS FOR ELECTRIC ACCUMULATORS.

SPECIFICATION forming part of Letters Patent No. 578,870, dated March 16, 1897.

Application filed June 27, 1895. Serial No. 554,280. (No specimens.)

*To all whom it may concern:*

Be it known that I, SIEGFRIED HAMMACHER, manufacturer, of 32 Andreasstrasse, Berlin, Kingdom of Prussia, German Empire, have invented new and useful Improvements in an Active Mass for Electric Accumulators, of which the following is a specification.

The said invention consists in manufacturing the active mass of electric accumulators by means of chemical reaction, so as to transform the originally incoherent mass into a porous, but also coherent, body for the purpose of obtaining a greater electromotive force than yielded through the application of ordinary lead oxids.

Experiments have shown that the oxids of lead, such as minium or litharge, when applied in excess and brought together with the bodies of the phenol group of the formula $C_nH_{n-1}OH$ in watery solution are transformed into bodies characterized as "basic" phenylates. The process of making said active material consists either in the direct formation of the phenylates from the oxids of lead by mixing the oxids with the watery solutions of the phenol bodies and then drying or in mixing the basic phenylates, which may be formed separately, with the oxids of lead with or without the assistance of a solvent for the phenylates. The dry mass may then be formed in the ordinary manner in dilute acid.

Having now described my invention, what I claim, and desire to secure by Letters Patent, is—

An active mass for electric accumulators, consisting of basic phenylates of lead mixed with the oxids of lead, as and for the purpose set forth.

In witness whereof I have hereunto signed my name in the presence of two subscribing witnesses.

SIEGFRIED HAMMACHER.

Witnesses:
    WILLIG ECKERT,
    OSCAR MICHAELIS.